US012605827B2

(12) United States Patent
Hasegawa et al.

(10) Patent No.: US 12,605,827 B2
(45) Date of Patent: Apr. 21, 2026

(54) OBJECT HOLDING METHOD AND NON-TRANSITORY COMPUTER READABLE MEDIUM

(71) Applicant: Honda Motor Co., Ltd., Tokyo (JP)

(72) Inventors: Tadaaki Hasegawa, Saitama (JP); Masanori Yoshihira, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 634 days.

(21) Appl. No.: 18/164,606

(22) Filed: Feb. 5, 2023

(65) Prior Publication Data

US 2023/0286137 A1 Sep. 14, 2023

(30) Foreign Application Priority Data

Mar. 8, 2022 (JP) .................................. 2022-035676

(51) Int. Cl.
| | |
|---|---|
| *B25J 9/16* | (2006.01) |
| *B25J 15/00* | (2006.01) |
| *G01B 11/24* | (2006.01) |
| *G05B 19/4155* | (2006.01) |

(52) U.S. Cl.
CPC ........... *B25J 9/1602* (2013.01); *B25J 9/1697* (2013.01); *G01B 11/24* (2013.01); *G05B 19/4155* (2013.01); *B25J 15/0009* (2013.01); *G05B 2219/40269* (2013.01)

(58) Field of Classification Search
CPC .... B25J 9/1602; B25J 9/1697; B25J 15/0009; B25J 9/1612; B25J 9/1687; G01B 11/24; G05B 19/4155; G05B 2219/40269
See application file for complete search history.

(56) References Cited

U.S. PATENT DOCUMENTS

| | | | |
|---|---|---|---|
| 9,321,176 B1 | 4/2016 | Sun et al. | |
| 2005/0128197 A1 | 6/2005 | Thrun et al. | |
| 2010/0087955 A1* | 4/2010 | Tsusaka | B25J 9/0003 |
| | | | 700/245 |
| 2019/0030712 A1* | 1/2019 | Sciog | B25J 9/1661 |

FOREIGN PATENT DOCUMENTS

| | | |
|---|---|---|
| CN | 113538459 | 10/2021 |
| DE | 102010051602 | 5/2012 |
| JP | 2005169564 | 6/2005 |
| JP | 2007524085 | 8/2007 |
| JP | 6476358 | 2/2019 |

OTHER PUBLICATIONS

"Office Action of Japan Counterpart Application", issued on Sep. 9, 2025, with English translation thereof, pp. 1-9.

* cited by examiner

*Primary Examiner* — Harry Y Oh
(74) *Attorney, Agent, or Firm* — JCIPRNET

(57) ABSTRACT

An object holding method includes: a step of determining a center of a first object assumed to be held by an end effector for a plurality of holding postures which the end effector is able to take; a step of measuring a shape of a second object based on an image in which the second object is captured from a viewpoint; a step of selecting a holding posture when the end effector holds the second object from the holding postures based on centers of the second object and the first object; and a step of reducing a portion of the shape of the second object in a case where the end effector holds the second object by using the selected holding posture.

19 Claims, 8 Drawing Sheets medium-wrap power-sphere tripod palmar-pinch prismatic-2fingers prismatic-3fingers Start

S100

Acquire image data and state data

S102

Measure a shape of an object

S104

Estimate a central axis of the object

S106

Determine a holding posture based on a holding taxonomy

S108

Correct the shape of the object based on a dead spot of a camera and a holding direction

S110

Generate a control command

S112

Transmit the control command to a robot

Return $P_{A3}$ $P_{A1}$　　　　　　$P_{A2}$ $P_B$ $P_B$

OBJECT HOLDING METHOD AND NON-TRANSITORY COMPUTER READABLE MEDIUM

CROSS-REFERENCE TO RELATED APPLICATION

This application claims the priority benefit of Japan application serial No. 2022-035676, filed on Mar. 8, 2022. The entirety of the above-mentioned patent application is hereby incorporated by reference herein and made a part of this specification.

BACKGROUND

Technical Field

The invention relates to an object holding method and a program.

Description of Related Art

Techniques allowing a robot to hold an object has been under development (see, for example, Patent Document 1).

PRIOR ART DOCUMENTS

Patent Documents

[Patent Document 1] Japanese Patent No. 6476358

In the conventional technique, the shape of the object is measured, then the object is held by using a gripper with low shape dependency, a holdable posture is explored to hold the object, and a holding manner is determined to hold the object by keeping moving joints at a predetermined speed ratio. However, in the conventional technique, there have been issues such as that the object can be held but cannot be operated, it is time consuming to explore the holdable posture, the robustness against shape errors is low, and the object can be grasped but cannot be held by using finger tips.

SUMMARY

An aspect of the invention provides an object holding method include: a step of determining a center of a first object assumed to be held by an end effector for each of a plurality of holding postures which the end effector is able to take; a step of measuring a shape of a second object based on an image in which the second object is captured from at least one viewpoint; a step of selecting one holding posture when the end effector holds the second object from the holding postures based on a center of the second object whose shape is measured and the center of the first object; and a step of reducing a portion, which is a portion of the shape of the second object that is measured, in which a dead spot is present when viewed from the viewpoint and to which a force is applied from the end effector to the second object, in a case where the end effector holds the second object by using the holding posture that is selected.

Another aspect of the invention provides a non-transitory computer readable medium, storing a program causing a computer to execute: a step of determining a center of a first object assumed to be held by an end effector for each of a plurality of holding postures which the end effector is able to take; a step of measuring a shape of a second object based on an image in which the second object is captured from at least one viewpoint; a step of selecting one holding posture when the end effector holds the second object from the holding postures based on a center of the second object whose shape is measured and the center of the first object; and a step of reducing a portion, which is a portion of the shape of the second object that is measured, in which a dead spot is present when viewed from the viewpoint and to which a force is applied from the end effector to the second object, in a case where the end effector holds the second object by using the holding posture that is selected.

DESCRIPTION OF THE EMBODIMENTS

Figures 1, 2:
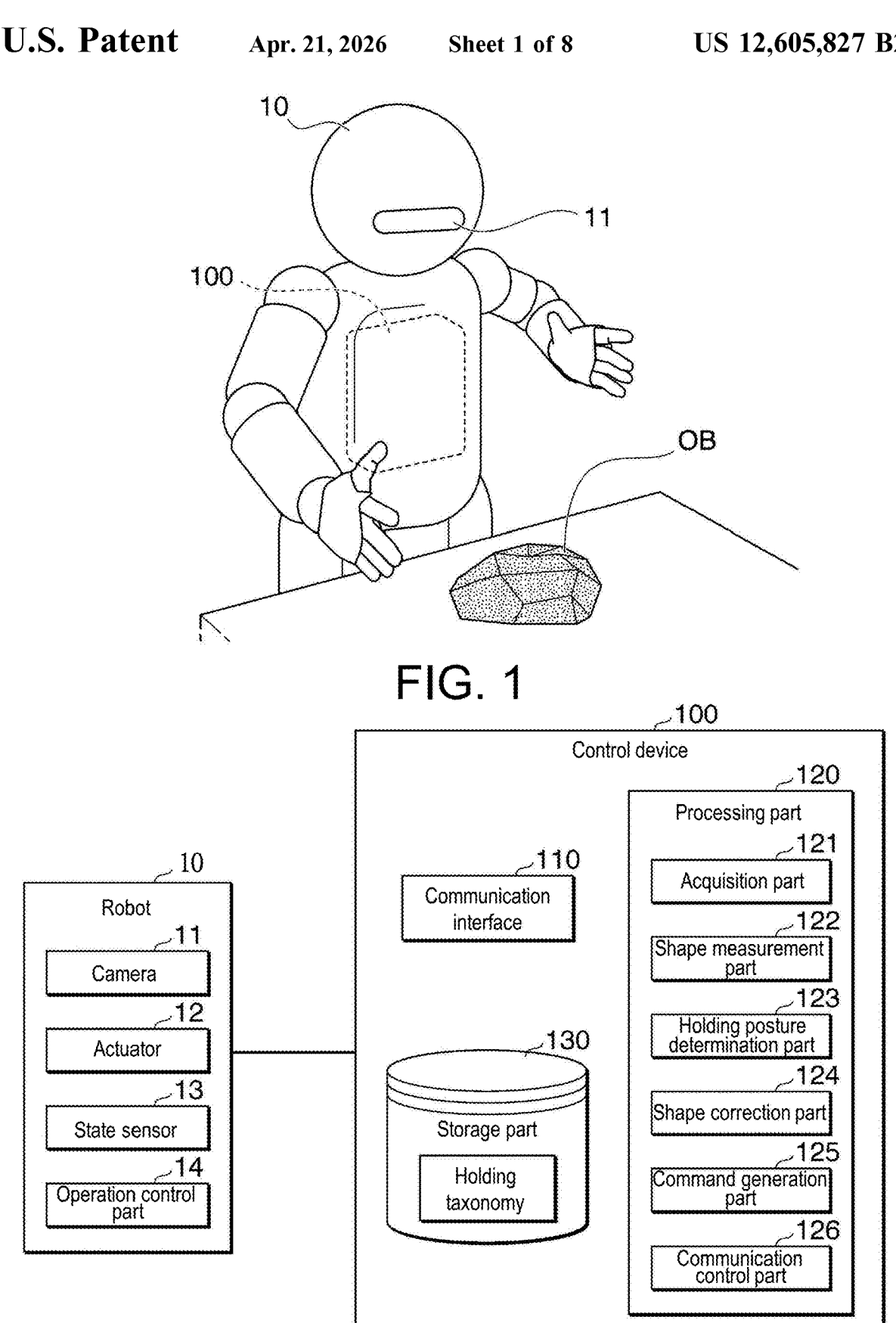
FIG. 1 is a schematic view illustrating the appearance of a robot 10 according to an embodiment.
FIG. 2 is a diagram illustrating a configuration of the robot 10 and a control device 100 according to an embodiment.

The invention provides an object holding method and a program capable of stably holding an object with higher robustness against measurement errors.

An object holding method and a program according to the invention adopt configurations as follows.

(1) An object holding method according to a first aspect of the invention includes: a step of determining a center of a first object assumed to be held by an end effector for each of a plurality of holding postures which the end effector is able to take; a step of measuring a shape of a second object based on an image in which the second object is captured from at least one viewpoint; a step of selecting one holding posture when the end effector holds the second object from the holding postures based on a center of the second object whose shape is measured and the center of the first object; and a step of reducing a portion, which is a portion of the shape of the second object that is measured, in which a dead spot is present when viewed from the viewpoint and to which a force is applied from the end effector to the second object, in a case where the end effector holds the second object by using the holding posture that is selected.

(2) According to the second aspect of the invention, in the first aspect, the step of selecting the holding posture includes: estimating the center of the second object whose shape is measured, and selecting, from the holding postures, a holding posture corresponding to the first object having a same center with the center of the second object that is estimated.

(3) According to the third aspect of the invention, in the first or second aspect, the holding postures include a first holding posture holding a side surface of a horizontal cylinder.

(4) According to the fourth aspect of the invention, in the third aspect, the first holding posture includes a limiting condition of directing a force applied from the end effector to the side surface when the end effector contacts the side surface of the horizontal cylinder to a central axis that is a longitudinal direction of the horizontal cylinder.

(5) According to the fifth aspect of the invention, in any one of the first to fourth aspects, the holding postures include a second holding posture of holding a spherical body.

(6) According to the sixth aspect of the invention, in the fifth aspect, the second holding posture includes a limiting condition of directing a force applied from the end effector to a surface of the spherical body when the end effector contacts the surface of the spherical body toward a center point of the spherical body.

(7) According to the seventh aspect of the invention, in any one of the first to sixth aspects, the holding postures include a third holding posture holding an end part of a vertical cylinder.

(8) According to the eighth aspect of the invention, in the seventh aspect, the third holding posture includes a limiting condition of directing a force applied from the end effector to an end part of the vertical cylinder when the end effector contacts the end part of the vertical cylinder to a central axis that is a longitudinal direction of the horizontal cylinder.

(9) According to the ninth aspect of the invention, in any one of the first to eighth aspects, the holding postures include a fourth holding posture holding an end part of a rectangular parallelepiped body.

(10) According to the tenth aspect of the invention, in the ninth aspect, the fourth holding posture includes a limiting condition of making a force applied from the end effector to an end part of the rectangular parallelepiped body when the end effector contacts the end part of the rectangular parallelepiped body parallel to a central axis that is a longitudinal direction of the rectangular parallelepiped body.

(11) A program according to an eleventh aspect of the invention causes a computer to execute: a step of determining a center of a first object assumed to be held by an end effector for each of a plurality of holding postures which the end effector is able to take; a step of measuring a shape of a second object based on an image in which the second object is captured from at least one viewpoint; a step of selecting one holding posture when the end effector holds the second object from the holding postures based on a center of the second object whose shape is measured and the center of the first object; and a step of reducing a portion, which is a portion of the shape of the second object that is measured, in which a dead spot is present when viewed from the viewpoint and to which a force is applied from the end effector to the second object, in a case where the end effector holds the second object by using the holding posture that is selected.

According to the above aspect, an object can be stably held with higher robustness against measurement errors.

In the following, embodiments of an object holding method and a program according to the invention are described with reference to the drawings.

[Robot Appearance]

FIG. 1 is a schematic view illustrating the appearance of a robot 10 according to an embodiment. In general, the robot 10 is a human-like robot (humanoid robot) capable of holding an object OB by using an end effector. However, the invention is not limited thereto. The robot 10 may be any type of robot as long as the robot 10 can hold the object OB. The end effector may also be referred to as a robot hand. In the following description, the end effector may sometimes be simply referred to as "hand". In the hand of the robot 10, for example, four fingers may be provided as a gripper.

The robot 10, for example, includes a camera 11 for imaging an external environment viewed from the robot 10 and a control device 100 for controlling the operation of the robot 10, and executes a desired task in accordance with an action determined by the control device 100.

The task is, for example, grasping the object OB by using the hand, switching the object OB to the other hand, or moving the object OB. However, the task is not limited to the above, and any task may be set.

The camera 11 is disposed at a portion (usually the head part) of the body of the robot 10. The camera 11, for example, is a depth camera (3D camera). For example, the camera 11 captures an image of the object OB, and transmits image data in which the object OB is written to the control device 100.

The control device 100, for example, performs autonomous control so that the robot 10 operates autonomously. The control device 100 is usually mounted on the robot 10 and directly controls the robot 10. Also, the control device 100 may also be disposed at a remote location far away from the robot 10, and control the robot 10 remotely through a network NW. The network NW includes a local area network (LAN) or a wide area network (WAN).

[Configuration of Robot and Control Device)

FIG. 2 is a diagram illustrating a configuration of the robot 10 and the control device 100 according to an embodiment. In addition to the camera 11, the robot 10 further includes an actuator 12, a state sensor 13, and an operation control part 14.

The actuator 12 is under the control of the operation control part 14 to drive respective parts (wrist, finger, foot, head, torso, waist, etc.) of the robot 10. The actuator 12, for example, includes an electromagnetic motor, a gear, an artificial muscle, etc.

The state sensor 13 is a sensor that detects a state (e.g., joint angle and/or angular velocity, torque, etc.) of the robot 10. The state sensor 13, for example, includes a rotary encoder that detects the degree of rotation of the joint of the robot 10, a tension sensor that detects tension of a wire for rotating the joint; a torque sensor that detects the torque applied to a joint shaft; an acceleration sensor or a gyro sensor for detecting the posture of the robot 10, etc.

The operation control part 14 controls the actuator 12 based on a control command generated by the control device 100.

The control device 100, for example, includes a communication interface 110, a processing part 120, and a storage part 130.

The communication interface 110 communicates with an external device via the network NW, and communicates with the robot 10 via a communication wire such as a bus. The external device, for example, is a terminal device (smart phone, personal computer, etc.) that can be used by a user requesting the robot 10 to execute a task. The communication interface 110, for example, includes a wireless communication module including a receiver and a transmitter, a network interface card (NIC), etc.

The processing part 120, for example, includes an acquisition part 121, a shape measurement part 122, a holding posture determination part 123, a shape correction part 124, a command generation part 125, and a communication control part 126.

The components forming the processing part 120, for example, are realized by executing a program or an instruction stored in the storage part 130 by using a central processing unit (CPU) or a graphics processing unit (GPU). Some or all of the forming components may be realized by using hardware such as a large scale integration (LSI) circuit, an application specific integrated circuit (ASIC), or a field-programmable gate array (FPGA), and may also be realized through cooperation between software and hardware.

The storage part 130 is realized by, for example, a hard disc drive (HDD), a flash memory, an electrically erasable programmable read only memory (EEPROM), a read only memory (ROM), a random access memory (RAM), etc. The storage part 130 stores a holding taxonomy in addition to firmware, application programs, etc.

The holding taxonomy is a database which classifies and categorizes multiple holding postures which the end effect is able to take, and in which a relationship between each holding posture corresponding to the classification category and the center of a reference object OBref assumed to be held by the end effector is defined in advance. "Center" refers to a central axis or a center point to be described afterwards. The holding taxonomy, for example, may be installed from an external device to the storage part 130 via the network NW, and may also be installed to the storage part 130 from a portable storage medium connected to a drive device of the control device 100. The reference object OBref on the holding taxonomy is an example of "first object".

Figure 3:
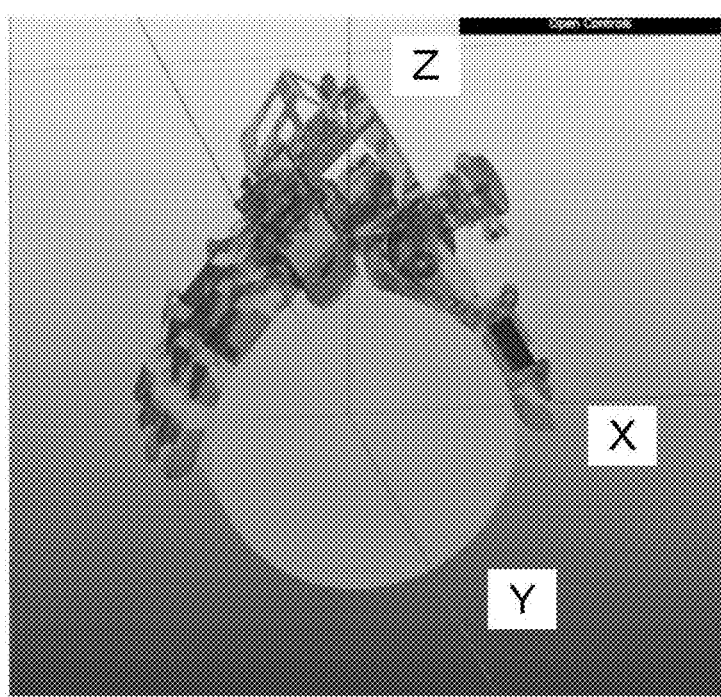
FIG. 3 is a view illustrating an example of holding taxonomy.

FIGS. 3 to 8 is a view illustrating examples of the holding taxonomy. FIG. 3 illustrates a holding posture referred to as "medium-wrap" which categorizes those in which a horizontal cylinder is held as the reference object OBref. For example, in the case where the length direction of the horizontal cylinder is set as Y-axis (the case where the horizontal cylinder extends in Y-axis direction), the central axis of the horizontal cylinder is Y-axis. Medium-wrap defines that a side surface of the horizontal cylinder is held by using all the fingers (grippers) from X-axis direction or Z-axis direction orthogonal to Y-axis that is the central axis of the horizontal cylinder. That is, medium-wrap means that a force (referred to as contact force in the following) applied from the finger tip to the side surface when the finger tip contacts the side surface of the horizontal cylinder is toward Y-axis that is the central axis of the horizontal circular column. Medium-wrap serves as an example of "first holding posture".

Figure 4:
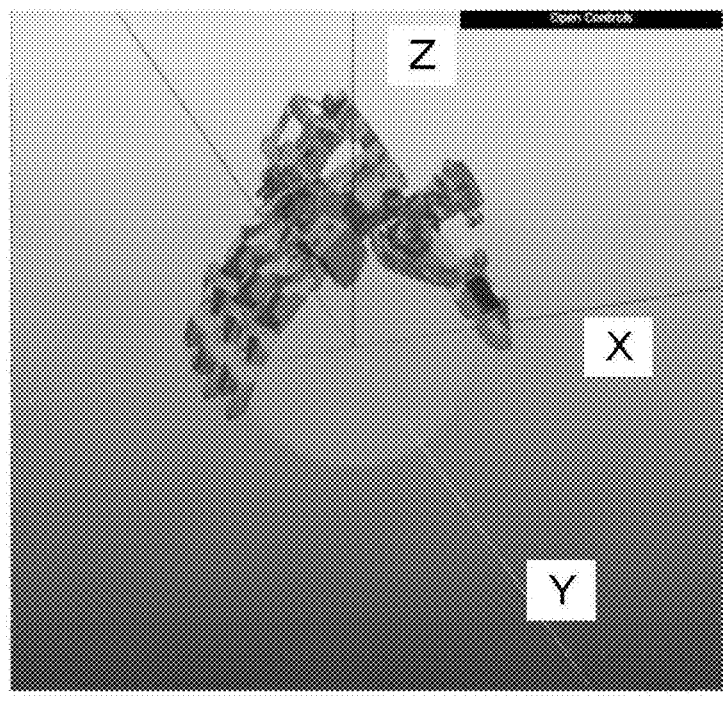
FIG. 4 is a view illustrating an example of holding taxonomy.

FIG. 4 illustrates a holding posture referred to as "power-sphere" which categorizes those in which a spherical body is held as the reference object OBref. Power-sphere defines that the spherical body is held so that the contact forces of all the fingers are toward the center point of the spherical body. In other words, in the case where the reference object OBref is a spherical body, since infinite central lines are present, power-sphere may select a central line capable of holding with minimum changes from the current holding posture of the hand and perform holding so that the contact force is directed toward the central line. Power-sphere serves as an example of "second holding posture".

Figure 5:
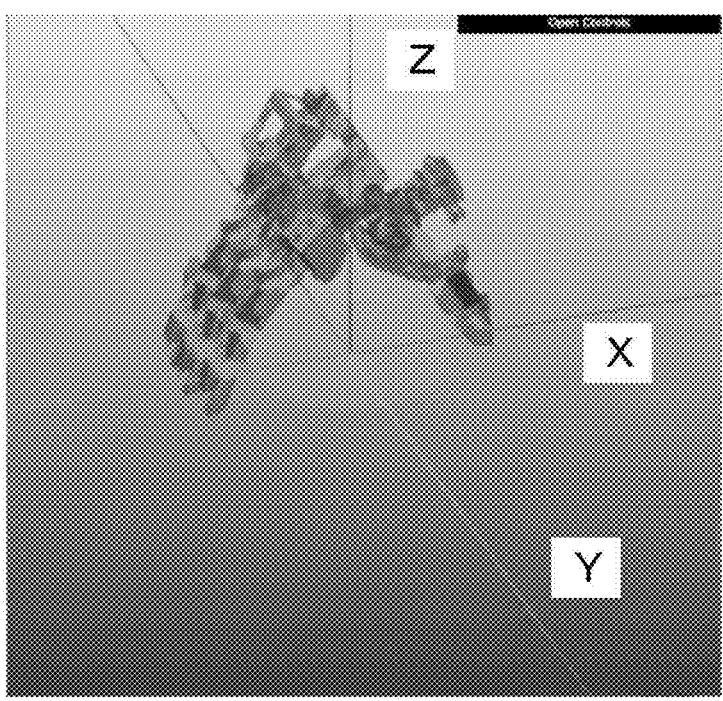
FIG. 5 is a view illustrating an example of holding taxonomy.

FIG. 5 illustrates a holding posture referred to as "tripod" which categorizes those in which a vertical cylinder is held as the reference object OBref. For example, in the case where the length direction of the vertical cylinder is set as Z-axis (the case where the vertical cylinder extends in Z-axis direction), the central axis of the vertical cylinder is Z-axis. Tripod in such case defines that an end part of the vertical cylinder is held or grasped by using three fingers so that the contact forces of the three fingers are respectively toward Z-axis. Tripod serves as an example of "third holding posture".

Figure 6:
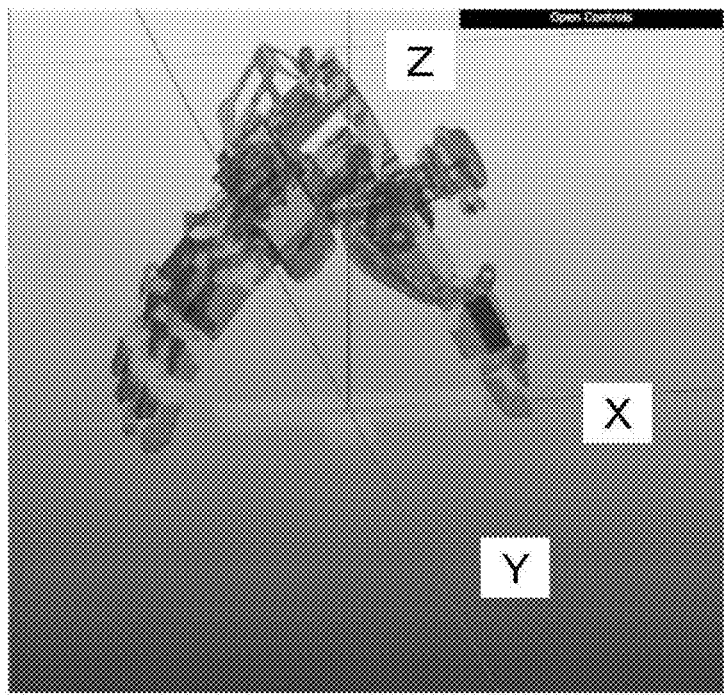
FIG. 6 is a view illustrating an example of holding taxonomy.

FIG. 6 illustrates a holding posture referred to as "palmar-pinch" which categorizes those in which a rectangular parallelepiped body in which the entire surface is square is held as the reference object OBref. For example, in the case where the length direction of the rectangular parallelepiped body is set as X-axis (the case where the vertical cylinder extends in X-axis direction), the central axis of the rectangular parallelepiped body is X-axis. Palmar-pinch in such case defines that an end part of the rectangular parallelepiped body is sandwiched by using two fingers so that the contact forces of the two fingers are respectively parallel to X-axis. Palmar-pinch serves as an example of "fourth holding posture".

Figure 7:
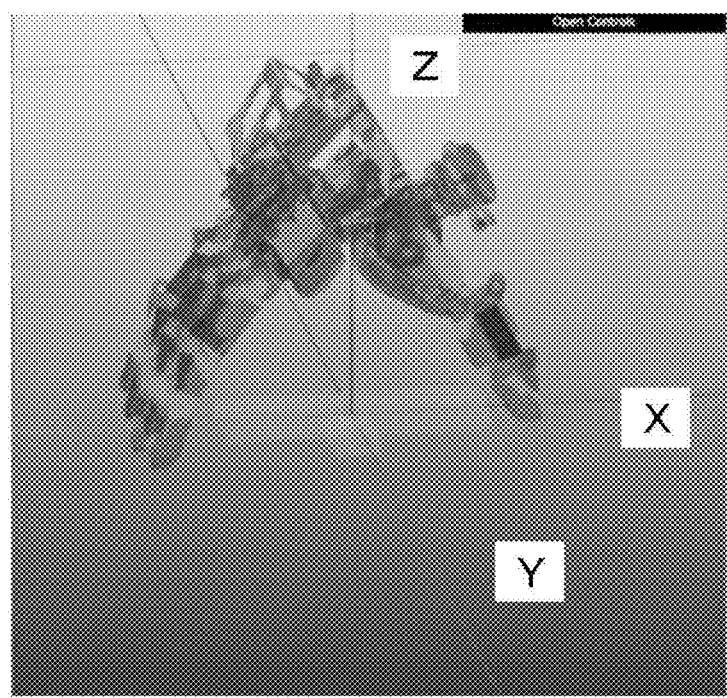
FIG. 7 is a view illustrating an example of holding taxonomy.

FIG. 7 illustrates a holding posture referred to as "prismatic-2fingers". Prismatic-2fingers, like palmar-pinch, categorizes those in which a rectangular parallelepiped body in which the entire surface is square is held as the reference object OBref. However, prismatic-2fingers targets at a rectangular parallelepiped body whose width is greater than that for palmar-pinch. Prismatic-2fingers defines that, in the case where the central axis of the rectangular parallelepiped body is X-axis, an end part of the rectangular parallelepiped body is sandwiched by three fingers, so that the contact forces of the three fingers are respectively parallel to X-axis. Prismatic-2fingers serves as another example of "fourth holding posture".

Figure 8:
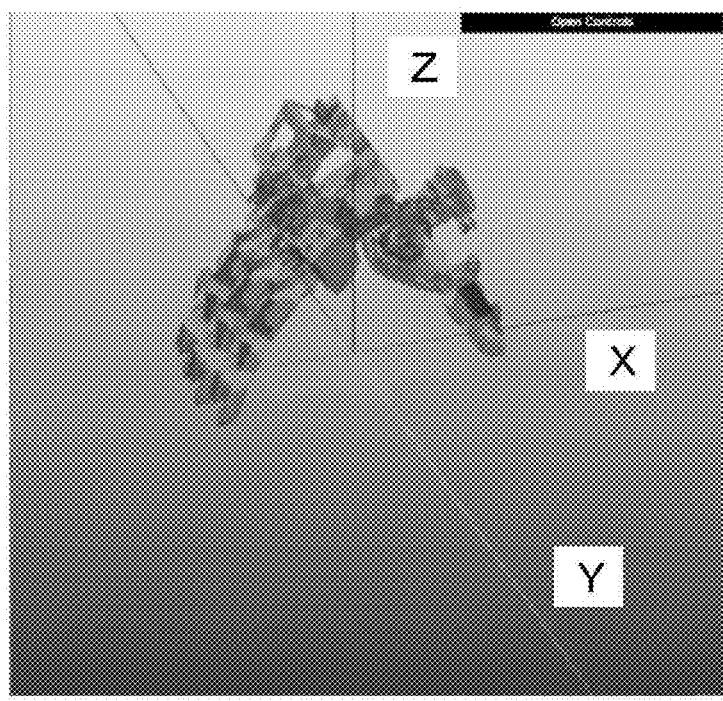
FIG. 8 is a view illustrating an example of holding taxonomy.

FIG. 8 illustrates a holding posture referred to as "prismatic-3fingers". Prismatic-3fingers, like palmar-pinch and prismatic-2fingers, categorizes those in which a rectangular parallelepiped body in which the entire surface is square is held as the reference object OBref. However, prismatic-3fingers targets at a rectangular parallelepiped body whose width is greater than prismatic-2fingers. Prismatic-3fingers defines that, in the case where the central axis of the rectangular parallelepiped body is X-axis, an end part of the rectangular parallelepiped body is sandwiched by four fingers, so that the contact forces of the four fingers are respectively parallel to X-axis. Prismatic-3fingers serves as another example of "fourth holding posture".

It is noted that the holding taxonomy is not limited to the above, holding postures may also be categorized for reference objects OBref in a triangular columnar shape or a conical shape.

[Process Flow of Control Device]

Figures 9, 10:
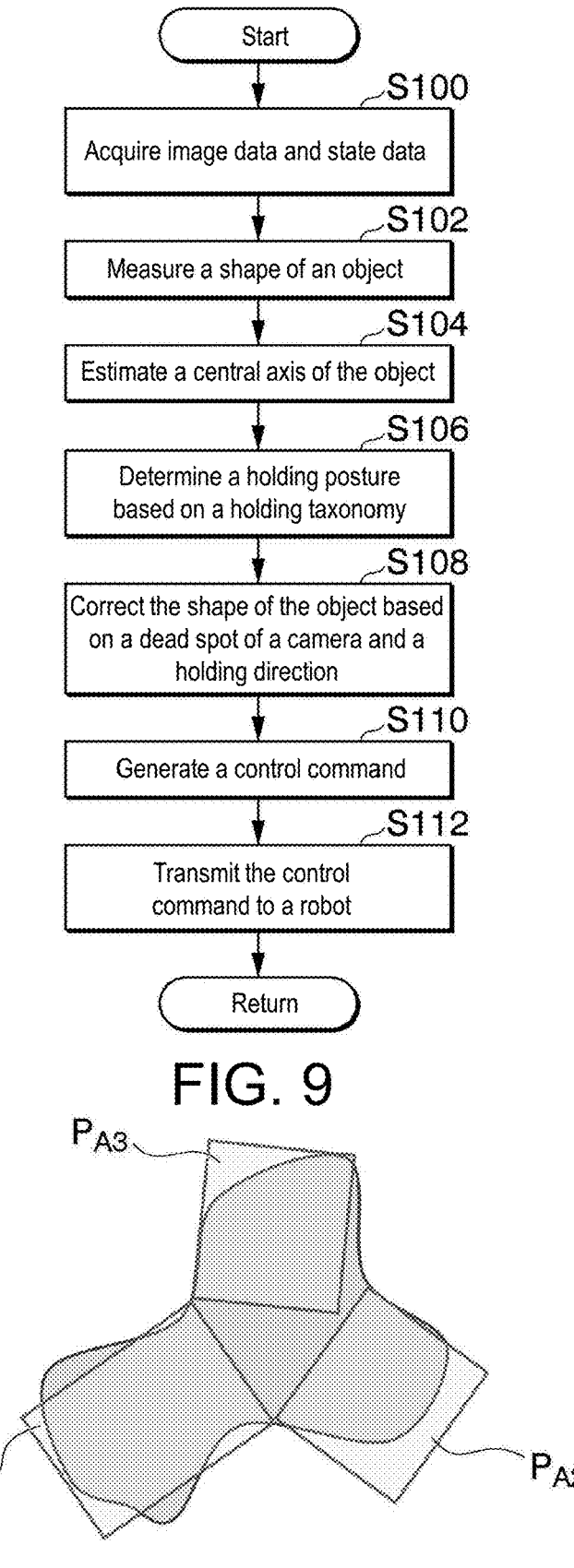
FIG. 9 is a flowchart illustrating a flow of a series of processes of a processing part 120 according to an embodiment.
FIG. 10 is a view illustrating an example of a process for selecting a holding posture.

In the following, a detailed process flow of the processing part 120 is described with a flowchart. FIG. 9 is a flowchart illustrating a flow of a series of processes of the processing part 120 according to an embodiment.

Firstly, the acquisition part 121 acquires image data and state data from the robot 10 via the communication interface 110 (Step S100).

The image data are image data generated when the camera 11 captures the image of the object OB. For example, in the case where the camera 11 is disposed at the head part of the robot 10, the acquisition part 121 acquires the image data when capturing the image of the target object OB from a viewpoint of the head part of the robot 10.

The state data include a detected value of the state sensor 13 of the robot 10. Specifically, the state data include the joint angle detected by the rotary encoder, the tension of the joint wire detected by the tension sensor, the torque of the joint shaft detected by the torque sensor, the acceleration of the robot 10 detected by the acceleration sensor, and the angular velocity of the robot 10 detected by the gyro sensor.

Then, the shape measurement part 122 measures the shape of the object OB based on the image data acquired by the acquisition part 121 (Step S102). "measure the shape" may also be read as "estimate the shape".

For example, the shape measurement part 122 extracts a point group indicating the profile of the object OB on the image, and sets a minimum primitive PA surrounding the point group on the image. The primitive PA is a basic shape used in modeling for graphic analysis, and typically in a simple shape such as a rectangular parallelepiped body, a cylinder, a spherical body. When the primitive PA is set on the image, the shape of the primitive PA serves as the shape of the object OB.

The shape measurement part 122 may also handle the point group indicating the profile of the object OB as the shape of the object OB.

Then, the shape measurement part 122 estimates the central axis of the object OB whose shape is measured (Step S104).

For example, in the case where the primitive PA is set on the image, the shape measurement part 122 sets the longitudinal direction of the primitive PA as the central axis of the object OB.

As another example, in the case where the point group indicating the profile of the object OB itself is set as the shape of the object OB, the shape measurement part 122 may explore the longest straight line in the region of the point group, and sets a direction parallel to the longest line as the central axis of the object OB.

Then, the holding posture determination part 123 determines the holding posture of the object OB based on the center of the reference object OBref in which the relationship with the holding posture is defined in the holding taxonomy and the center of the object OB (Step S106).

For example, the holding posture determination part 123 selects a holding posture by using the center of the target object OB as a limiting condition from multiple holding postures in which the relationships with the center of the reference object OBref is defined in the holding taxonomy.

Figures 11, 12, 13:
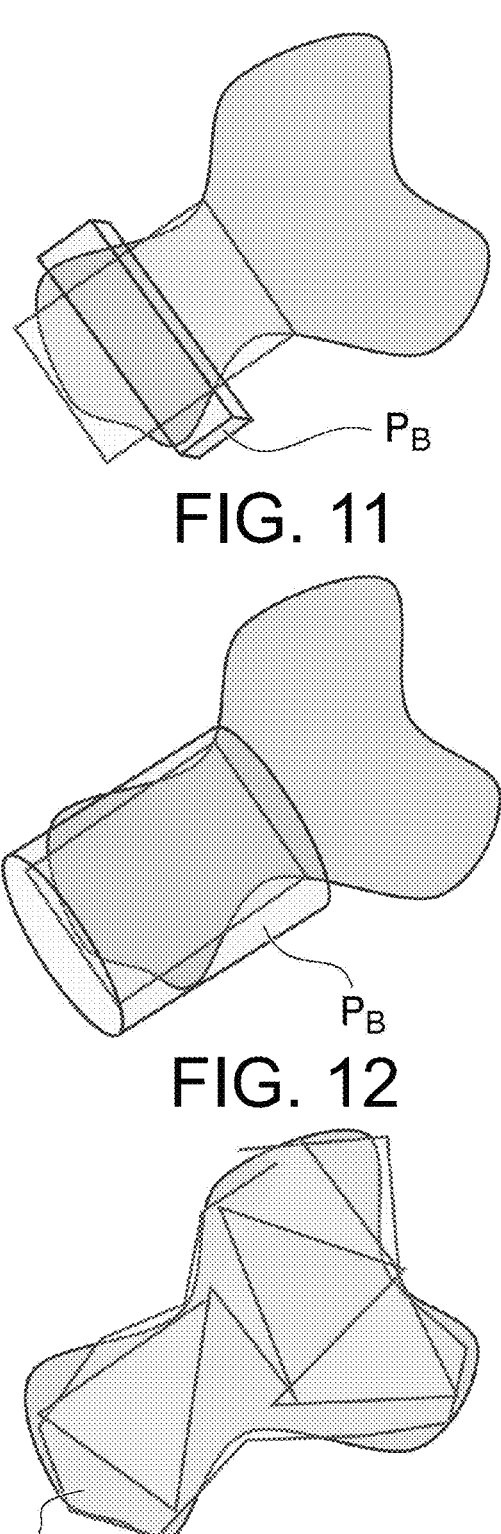
FIG. 11 is a view illustrating an example of a process for selecting a holding posture.
FIG. 12 is a view illustrating an example of a process for selecting a holding posture.
FIG. 13 is a view illustrating another example of a process for selecting a holding posture.

FIGS. 10 to 12 are views illustrating examples of a process for selecting the holding posture. In FIGS. 10 to 12, a case where the shape of the object OB is known to a certain level is described.

For example, it is assumed that the user knows the shape of the object OB to some extent, and provides the control device 100 with information about the shape, such as which part of the object OB should be held, by using a terminal device. In such case, the shape measurement part 122 sets the primitive PA at a portion that should be held by the robot 10 as designated by the user. In the example of FIG. 10, it is possible to set the primitives at three places, that is, $P_{A1}$, $P_{A2}$, and $P_{A3}$. For example, the primitive $P_{A1}$ of "rectangular parallelepiped body" is set. In such case, the shape measurement part 122 estimates the longitudinal direction of the primitive $P_{A1}$ of "rectangular parallelepiped body" as the central axis of the object OB.

Upon receiving the estimation, for example, the holding posture determination part 123 refers to the holding taxonomy to select the reference object OBref having the same central axis as the central axis of the target OB, and selects the holding posture in which the relationship with the central axis of the reference object OBref is defined as the holding posture of the object OB.

For example, as shown in FIG. 11, in the case where the long thin holding center primitive $P_B$ having a width that allows two fingers to be placed on one end and one finger to be placed on the other end in a direction orthogonal to the longitudinal direction of the primitive $P_{A1}$ of "rectangular parallelepiped body" (the central axis of the object OB) can be set, the holding posture determination part 123 selects the holding posture referred to as "prismatic-2fingers" as the holding structure of the object OB.

The holding center primitive $P_B$ is a primitive that should be set as the holding center which determines at which positions the fingers of the robot 10 touch the object OB, and is a primitive that is compared with the center of the reference object OBref where the relationship with holding posture is defined in the holding taxonomy.

As another example, as shown in FIG. 12, in the case where the holding center primitive $P_B$ of the horizontal cylinder, which sets the longitudinal direction of the primitive $P_{A1}$ of "rectangular parallelepiped body" (the central axis of the object OB) as the length, can be set, the holding posture determination part 123 selects the holding posture of "medium-wrap" as the holding posture of the object OB.

Figure 14:
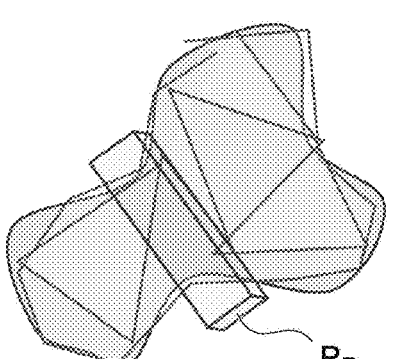
FIG. 14 is a view illustrating another example of a process for selecting a holding posture.
Figure 15:
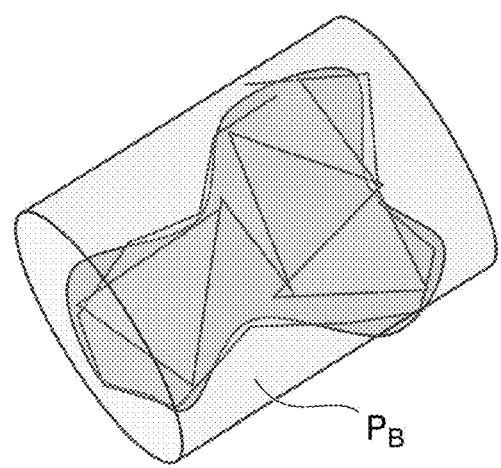
FIG. 15 is a view illustrating another example of a process for selecting a holding posture.

FIGS. 13 to 15 are views illustrating another example of a process for selecting a holding posture. In FIGS. 13 to 15, the case where the shape of the object OB is unknown is described.

For example, in the case where the shape of the object OB is unknown, the shape measurement part 122 uses polygon fitting, etc., to set a polyhedral primitive PA on the entire object OB. In addition, the shape measurement part 122 explores the longest straight line in the polyhedral primitive PA, and estimates the direction parallel to such longest straight line as the central axis of the object OB.

Upon receiving the estimation, in the case where the holding center primitive $P_B$ can be set in the direction orthogonal to the central axis of the object OB, as shown in FIG. 14, for example, the holding posture determination part 123 selects the holding posture of "prismatic-2fingers" as the holding posture of the object OB.

In addition, as shown in FIG. 15, for example, in the case where the holding center primitive $P_B$ of the horizontal cylinder in which the central axis of the object OB is set as the length direction can be set, the holding posture determination part 123 selects the holding posture of "medium-wrap" as the holding posture of the object OB.

Referring to the flowchart of FIG. 9 again, then, the shape correction part 124 corrects the shape of the object OB measured by the shape measurement part 122 based on a blind spot of the camera 11 and a holding direction (Step S108).

Figure 16:
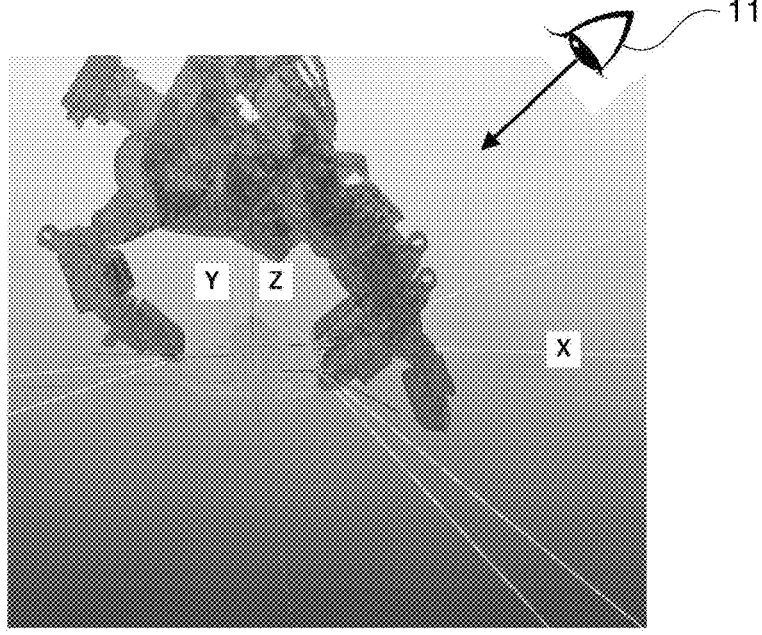
FIG. 16 is a view illustrating a process for correcting a shape of the object OB.
Figure 17:
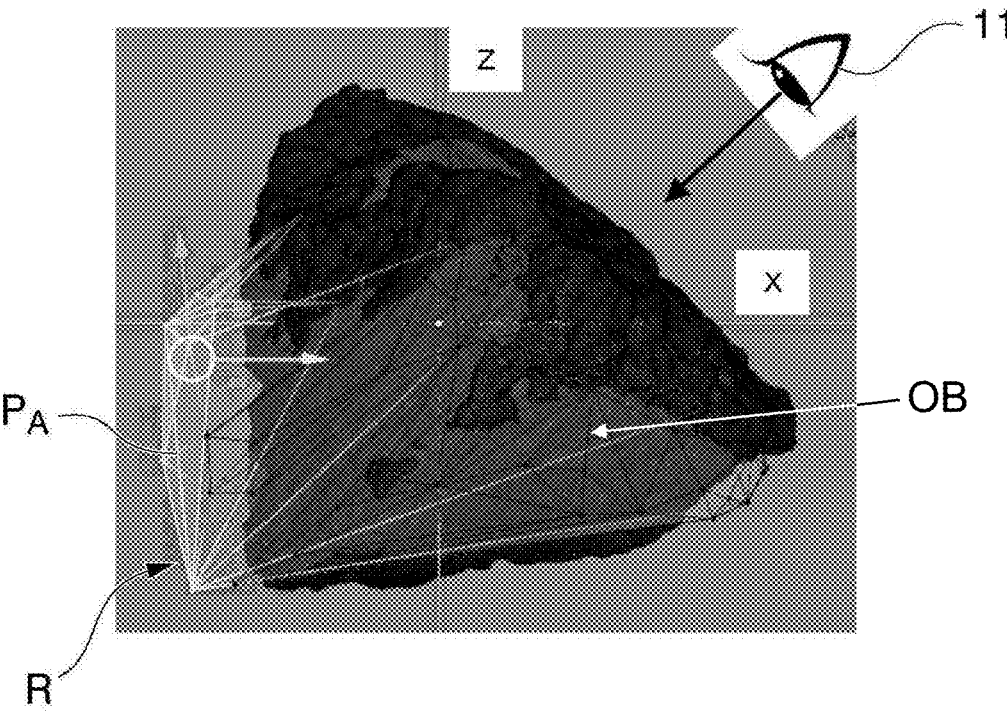
FIG. 17 is a view illustrating a process for correcting a shape of the object OB.
Figure 18:
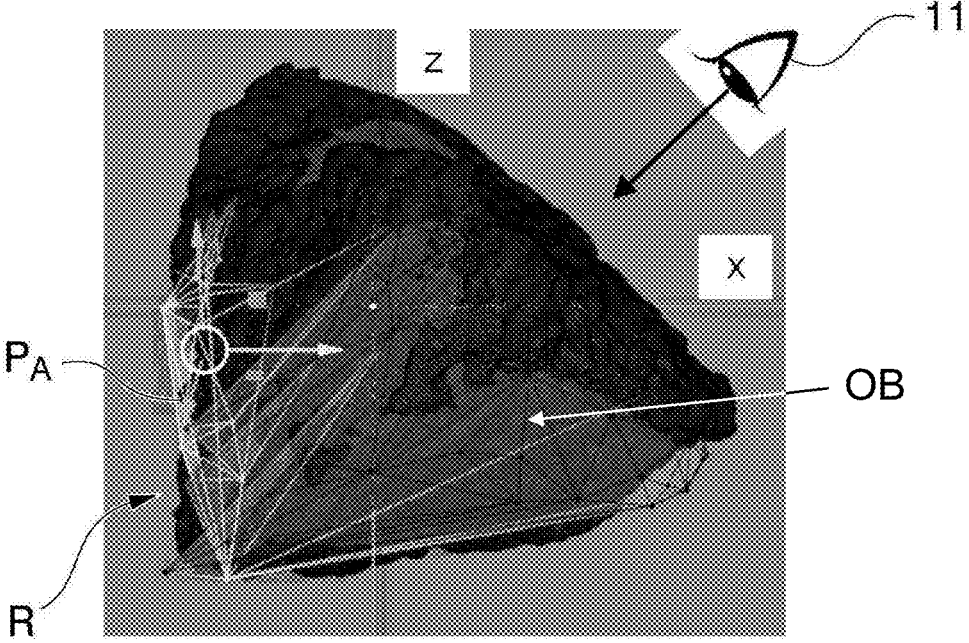
FIG. 18 is a view illustrating a process for correcting a shape of the object OB.

FIGS. 16 to 18 are views illustrating a process for correcting the shape of the object OB. FIG. 16 illustrates a situation in which the object OB is held by using a holding posture of "prismatic-2fingers". Since Y-axis in the figure is the central axis of the object OB, the object OB is held by using three fingers, so that the contact forces of the three fingers are respectively parallel to X-axis orthogonal to Y-axis. Here, in the case where the camera 11 is disposed at the head part higher than the position of the hand, the back side of the object OB becomes a blind spot of the camera 11, and an error in the measurement of the object OB may occur. Therefore, the shape correction part 124 corrects the shape of the object OB with the assumption that a measurement error occurs.

For example, FIG. 17 illustrates a situation in which the object OB whose shape is measured with higher accuracy by using laser light, etc., (referred to as the object OB close to the actual shape in the following) is superimposed to the polyhedral primitive PA set over the entire object OB. As illustrated, in the blind spot region (the portion of R in the figure) of the camera 11, compared with the object OB close to the actual shape, the shape of the polyhedral primitive PA, that is, the shape of the object OB is measured to be larger.

In such case, as shown in FIG. 18, the shape correction part 124 reduces a portion of the shape of the object OB measured to bulge out significantly. Specifically, the shape correction part 124 does not reduce the shape of the object OB over the entire blind region, but only reduces the shape of the portion where the contact force is applied from the finger tip to the object OB. The portion where the contact force is applied from the finger tip to the object OB is a portion where the holding center primitive $P_B$ is set. Accordingly, for example, in FIG. 16, although the shape of the object OB is reduced in X-axis direction, the shape of the object OB in Y-axis direction is not reduced. Even if there is a measurement error in X-axis direction, the holding posture of "prismatic-2fingers" can be maintained, while the limiting condition that the contact force of each finger is parallel to X-axis is satisfied. In addition, in the case where the shape of the object in Y-axis direction is reduced, the number of fingers capable of holding the object OB are reduced (holding area is reduced). As a result, it may become necessary to change the holding posture again. However, in the embodiment, the shape of the object OB in Y-axis direction is not reduced, but only the shape of the object OB in X-axis direction in which the contact force is applied is reduced. Therefore, the same holding posture can be maintained, while the measurement error is tolerated.

Referring to the flowchart of FIG. 9 again, then, the command generation part 125 generates a control command for controlling each actuator 12 of the robot 10 based on the holding posture determined by the holding posture determination part 123, the shape of the object OB in which a portion is reduced by the shape correction part 124, and the state data acquired by the acquisition part 121 (Step S110).

For example, the command generation part 125 determines a control amount of each actuator 12 necessary for further satisfying the limiting condition while taking the holding posture with respect to the object OB whose shape is reduced in part, and generates a control command including the control amount.

Then, the communication control part 126 transmits the control command to the robot via the communication interface 110 (Step S112). When receiving the control command, the operation control part 14 of the robot 10 controls the actuator 12 based on the control command. Accordingly, the robot 10 takes action, and the task of holding the object OB is executed. Accordingly, the process of the flowchart ends.

According to the embodiment described above, the control device 100 of the robot 10 measures the shape of the object OB based on the image of the object OB captured by the camera 11, and estimates the center of the object OB. The control device 100 determines one holding posture, among the holding postures in the holding taxonomy, as the holding posture of the object OB based on the center of the reference object OBref in which the relationship with the holding posture is defined in the holding taxonomy and the center of the object OB. In the case where the robot 10 holds the object OB by using the holding posture that is selected, the control device 100 reduces a portion of the shape of the object OB which may include a measurement error. Specifically, the control device 100 reduces a portion that is in the blind spot of the camera 11 and that is applied with a contact force from the finger tip to the object OB when the object OB is held in the selected holding posture. Accordingly, by using the hand with multiple degrees of freedom that can take multiple holding postures, even if the object OB has an unknown shape or a complicated shape, the object OB can be held stably and robustly against measurement errors.

The embodiment described above can be expressed as follows. A control device includes: a storage medium storing computer-readable instructions; and a processor connected to the storage medium. The processor executes the computer-readable instructions to: determine a center of a first object assumed to be held by an end effector for each of a plurality of holding postures which the end effector is able to take; measure a shape of a second object based on an image in which the second object is captured from at least one viewpoint; select one holding posture when the end effector holds the second object from the holding postures based on a center of the second object whose shape is measured and the center of the first object; and reduce a portion, which is a portion of the shape of the second object that is measured, in which a dead spot is present when viewed from the viewpoint and to which a force is applied from the end effector to the second object, in a case where the end effector holds the second object by using the holding posture that is selected.

In addition, the embodiment described above can be expressed as follows. An object holding method includes: a step of measuring a shape of a holding object based on an image in which the holding object is captured from at least one viewpoint; a step of selecting one holding posture when the end effector holds the holding object from the holding postures based on a center of a reference object assumed to be held by the end effector, which is the center of the reference object corresponding to each holding posture that the end effector is able to take, and a center of the holding object whose shape is measured; and a step of reducing a portion, which is a portion of the shape of the holding object that is measured, in which a dead spot is present when viewed from the viewpoint and to which a force is applied from the end effector to the holding object, in a case where the end effector holds the holding object by using the holding posture that is selected.

Although the mode for carrying out the invention has been described above according to the embodiments, the invention shall not be limited to these embodiments. Various modifications and replacements can be made without departing from the gist of the present invention.

What is claimed is:

1. An object holding method, comprising:

a step of determining a geometric central line of a first object to be held by an end effector for each of a plurality of holding postures which the end effector is able to take, and storing a relationship between the determined geometric central line of the first object and the corresponding holding postures for each of the plurality of holding postures in a database;

a step of measuring a shape of a second object based on an image in which the second object is captured from at least one viewpoint;

a step of selecting a first holding posture from the plurality of holding postures based on a geometric central line of a geometric primitive of the second object whose shape is measured and the relationship stored in the first object; and a step of reducing a portion of the shape of the second object that is measured, wherein the portion is a dead spot that is present when viewed from the viewpoint and to which a force is applied from the end effector to the second object, in a case where the end effector holds the second object by using the selected first holding posture.

2. The object holding method as claimed in claim 1, wherein the step of selecting the selected first holding posture comprises:

estimating the geometric central line of the geometric primitive of the second object whose shape is measured, and selecting, from the plurality of holding postures, the selected first holding posture corresponding to the first object having a same geometric central line with the geometric central line of the geometric primitive of the second object that is estimated.

3. The object holding method as claimed in claim 1, wherein the plurality of holding postures comprise a first posture holding a side surface of a horizontal cylinder.

4. The object holding method as claimed in claim 3, wherein the first posture comprises a limiting condition of directing a force applied from the end effector to the side surface when the end effector contacts the side surface of the horizontal cylinder to a central axis that is a longitudinal direction of the horizontal cylinder.

5. The object holding method as claimed in claim 1, wherein the plurality of holding postures comprise a second posture of holding a spherical body.

6. The object holding method as claimed in claim 5, wherein the second posture comprises a limiting condition of directing a force applied from the end effector to a surface of the spherical body when the end effector contacts the surface of the spherical body toward a center point of the spherical body.

7. The object holding method as claimed in claim 1, wherein the plurality of holding postures comprise a third posture holding an end part of a vertical cylinder.

8. The object holding method as claimed in claim 7, wherein the third posture comprises a limiting condition of directing a force applied from the end effector to an end part of the vertical cylinder when the end effector contacts the end part of the vertical cylinder to a central axis that is a longitudinal direction of the horizontal cylinder.

9. The object holding method as claimed in claim 1, wherein the plurality of holding postures comprise a fourth posture holding an end part of a rectangular parallelepiped body.

10. The object holding method as claimed in claim 9, wherein the fourth posture comprises a limiting condition of making a force applied from the end effector to an end part of the rectangular parallelepiped body when the end effector contacts the end part of the rectangular parallelepiped body parallel to a central axis that is a longitudinal direction of the rectangular parallelepiped body.

11. A non-transitory computer readable medium, storing a program causing a computer to execute:

a step of determining a geometric central line of a first object to be held by an end effector for each of a plurality of holding postures which the end effector is able to take, and storing a relationship between the determined geometric central line of the first object and the corresponding holding postures for each of the plurality of holding postures in a database;

a step of measuring a shape of a second object based on an image in which the second object is captured from at least one viewpoint;

a step of selecting a first holding posture from the plurality of holding postures based on a geometric central line of a geometric primitive of the second object whose shape is measured and the relationship stored in the first object; and a step of reducing a portion of the shape of the second object that is measured, wherein the portion is a dead spot that is present when viewed from the viewpoint and to which a force is applied from the end effector to the second object, in a case where the end effector holds the second object by using the selected first holding posture.

12. The object holding method as claimed in claim 2, wherein the plurality of holding postures comprise a first posture holding a side surface of a horizontal cylinder.

13. The object holding method as claimed in claim 12, wherein the first posture comprises a limiting condition of directing a force applied from the end effector to the side surface when the end effector contacts the side surface of the horizontal cylinder to a central axis that is a longitudinal direction of the horizontal cylinder.

14. The object holding method as claimed in claim 2, wherein the plurality of holding postures comprise a second posture of holding a spherical body.

15. The object holding method as claimed in claim 14, wherein the second posture comprises a limiting condition of directing a force applied from the end effector to a surface of the spherical body when the end effector contacts the surface of the spherical body toward a center point of the spherical body.

16. The object holding method as claimed in claim 2, wherein the plurality of holding postures comprise a third posture holding an end part of a vertical cylinder.

17. The object holding method as claimed in claim 16, wherein the third posture comprises a limiting condition of directing a force applied from the end effector to an end part of the vertical cylinder when the end effector contacts the end part of the vertical cylinder to a central axis that is a longitudinal direction of the horizontal cylinder.

18. The object holding method as claimed in claim 2, wherein the plurality of holding postures comprise a fourth posture holding an end part of a rectangular parallelepiped body.

19. The object holding method as claimed in claim 18, wherein the fourth posture comprises a limiting condition of making a force applied from the end effector to an end part of the rectangular parallelepiped body when the end effector contacts the end part of the rectangular parallelepiped body parallel to a central axis that is a longitudinal direction of the rectangular parallelepiped body.

* * * * *